(12) United States Patent
Shinohara (10) Patent No.: US 6,377,408 B1
(45) Date of Patent: Apr. 23, 2002

(54) LENS BARREL

(75) Inventor: Mitsuru Shinohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,176

(22) Filed: Dec. 7, 1999

(30) Foreign Application Priority Data

Dec. 14, 1998 (JP) .......................................... 10-354729
Jul. 15, 1999 (JP) .......................................... 11-201479

(51) Int. Cl.[7] ................................................ G02B 7/02
(52) U.S. Cl. ...................... 359/826; 359/694; 359/704; 174/254; 361/750
(58) Field of Search .................................. 359/694, 826, 359/703, 704; 174/254; 361/750, 751, 749

(56) References Cited

FOREIGN PATENT DOCUMENTS

JP           j410160995 A   * 12/1996

* cited by examiner

*Primary Examiner*—Georgia Epps
*Assistant Examiner*—Tim Thompson
(74) *Attorney, Agent, or Firm*—Robin, Blecker & Daley (57) ABSTRACT

A lens barrel includes a fixed lens tube of cylindrical shape and a plurality of operation parts of push type, wherein the plurality of operation parts are interconnected by a ring-shaped elastic member and are attached to the fixed lens tube. This structural arrangement of the lens barrel effectively simplifies assembly processes in the manufacture of lens barrels.

9 Claims, 10 Drawing Sheets

PRIOR ART

LENS BARREL

BACKGROUND OF THE INVENTION

1. Field of the Invention

The present invention relates to a lens barrel of an optical apparatus such as a camera or the like, and more particularly to a lens barrel having a mechanism arranged to move a lens by means of an actuator.

2. Description of Related Art

It has recently become a main trend to provide cameras with an AF (automatic focusing) function of automatically carrying out focus adjustment. A camera of this type is arranged to adjust focus, for example, by driving a focusing lens system with a motor disposed within a lens barrel.

Meanwhile, in order to improve the operability of large-sized lens barrels such as a large-aperture telephoto lens during the photo-taking operation, many of them have come to be manufactured to have various functions. For example, since the depth of field of a lens such as a telephoto lens with a large aperture is shallow, an object of shooting is apt to be missed or the lens is apt to be automatically focused on a wrong object, or it is hardly possible to adequately follow a fast moving object during a panning operation. To solve this problem, such a lens is sometimes used by fixing its focus. For this purpose, a lens barrel of the lens is provided with a focus lock switch. The focus lock switch permits the focus fixing action even during an AF photo-taking operation. It is also conceivable to obviate the necessity of an AF starting operation of half pushing a release button on the camera, by arranging an AF start switch in a position near to a part of the lens barrel where the left hand of a camera user comes in holding the lens barrel, so that the release button of the camera can be arranged to be used only for operating a shutter.

Further, some of the recently marketed lenses are provided with an image stabilizing function of automatically correcting image shakes. A lens of that kind is arranged, for example, to have an image-shake correcting lens system in combination with an image stabilizing switch disposed at its lens barrel and to correct image shakes by operating the image stabilizing switch to drive the image-shake correcting lens system.

Figure 8A:
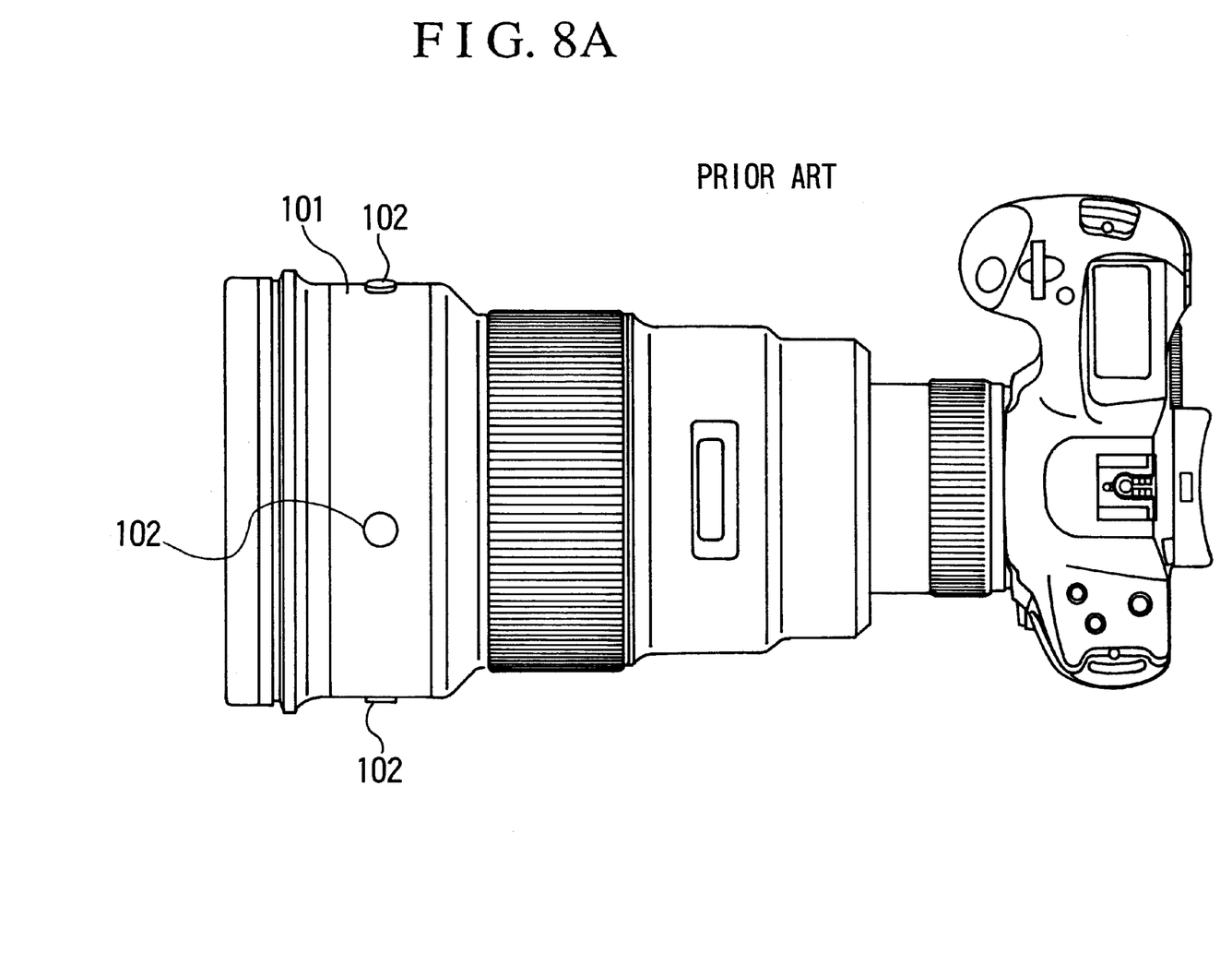
FIGS. 8A and 8B are plan views showing the appearances of the conventional lens barrels.
Figure 8B:
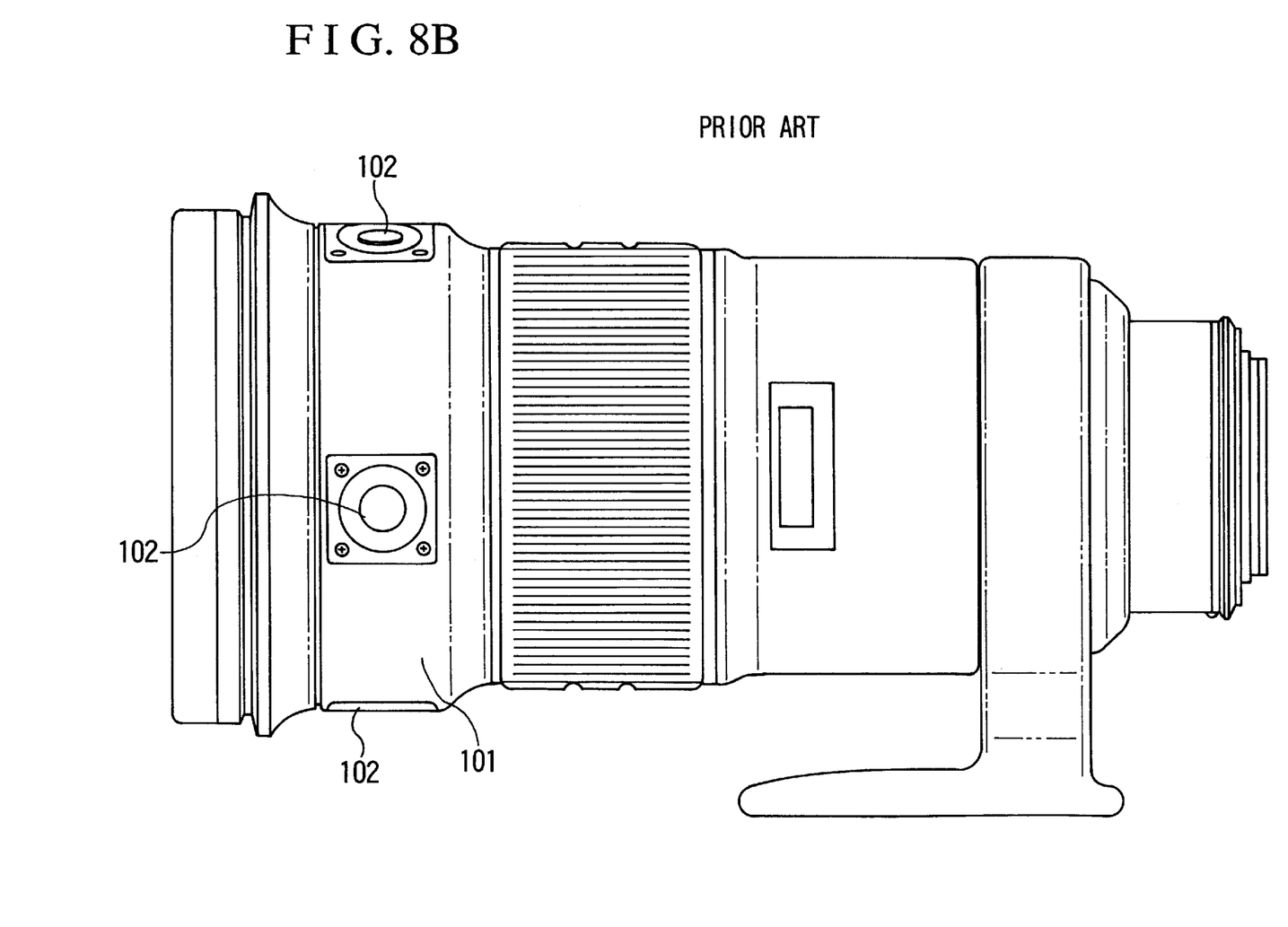

These operation switches mentioned above are arranged to be always easily operable irrespective as to whether the camera user is holding the camera in its vertical posture or in its horizontal posture and whether the camera is held by hand or held on a unipod or on a tripod. For this purpose, these operation switches are allocated, for example, at equally spaced four positions along the outer circumferential surface of an external fixed tube 101, as indicated by reference numeral 102 in FIGS. 8A and 8B.

Figure 9:
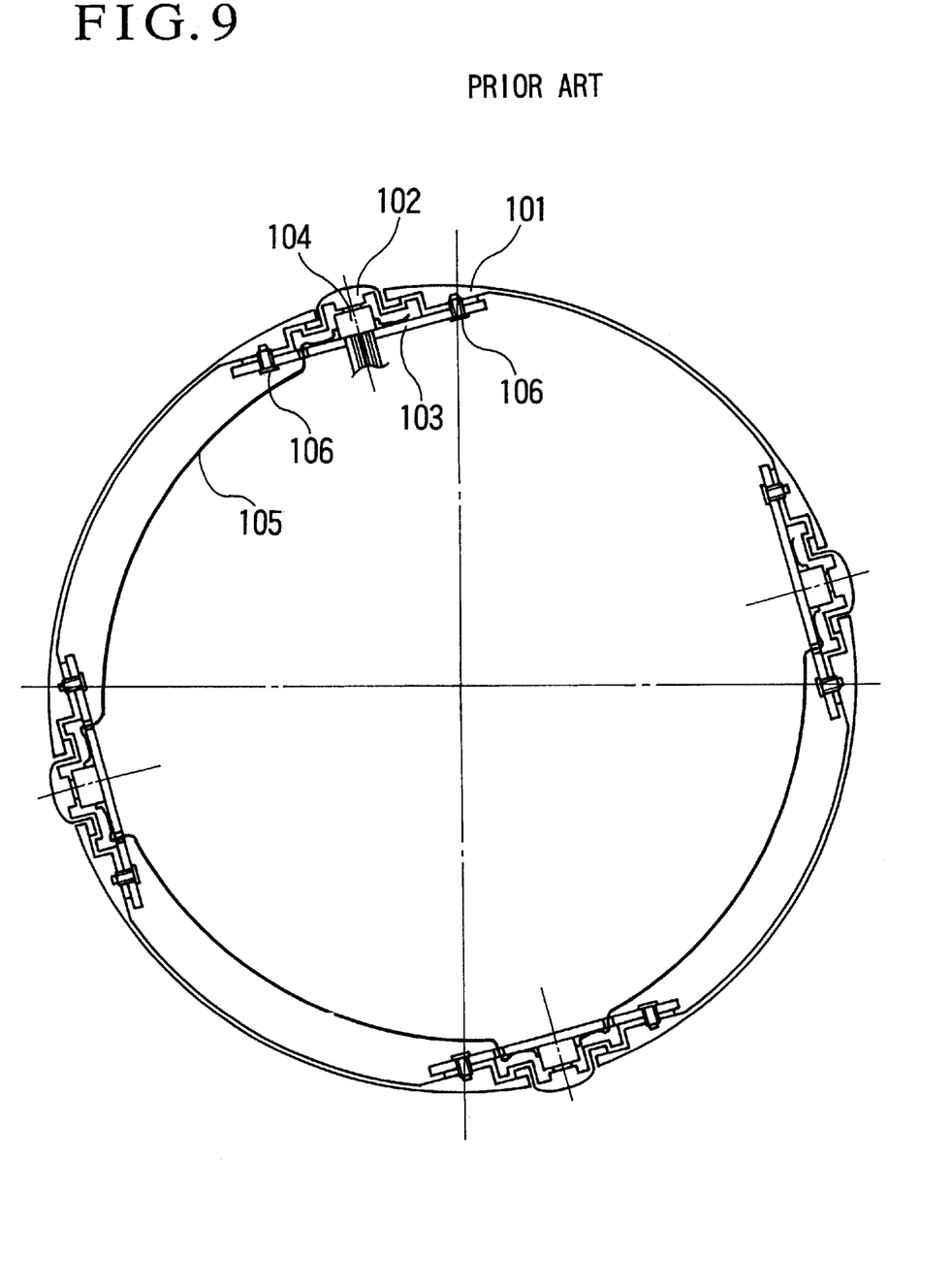
FIG. 9 is a sectional view showing essential parts of the conventional lens barrel.

In allocating the focus lock switches, the AF start switches or the image stabilizing switches in a plurality of equally spaced positions along the outer circumferential surface of the external fixed tube 101, the conventional lens barrel is arranged, for example, as shown in FIG. 9. Referring to FIG. 9, operation buttons 102, electric switches 104 and switch fixing members 103 are arranged in four sets in identical shapes. The four sets are respectively secured to the external fixed tube 101 with screws 106. The conventional arrangement, however, has a drawback in respect of assembly work and thus has caused an increase in cost. Incidentally, in FIG. 9, reference numeral 105 denotes a flexible printed circuit board.

BRIEF SUMMARY OF THE INVENTION

The present invention is directed to the solution of the problem of the prior art described above. It is, therefore, an object of the invention to provide a lens barrel which is arranged to facilitate assembly work, even in a case where focus lock switches, AF start switches or image stabilizing switches are allocated at a plurality of equally spaced positions along the outer circumferential surface of an external fixed tube, so that the cost of the lens barrel can be prevented from being caused to increase by difficulty in carrying out assembly work.

To attain the above object, in accordance with an aspect of the invention, there is provided a lens barrel comprising a fixed lens tube of cylindrical shape and a plurality of operation parts of push type, wherein the plurality of operation parts are interconnected by a ring-shaped elastic member and are attached to the fixed lens tube.

In the lens barrel, the ring-shaped elastic member is attached to an inner circumferential surface of the fixed lens tube.

The lens barrel further includes a second lens tube of cylindrical shape which is disposed on an inner side of the ring-shaped elastic member and which has electric switches disposed thereon respectively in positions corresponding to the plurality of operation parts, and wherein each of the electric switches is operable by operating a corresponding one of the plurality of operation parts.

In the lens barrel, the electric switches are interconnected by a flexible printed circuit board.

In the lens barrel, the ring-shaped elastic member is pushed and pressed by an outer circumferential surface of the second lens tube.

Alternatively, in the lens barrel, the ringshaped elastic member is attached to an outer circumferential surface of the fixed lens tube.

In the lens barrel, the fixed lens tube has electric switches disposed thereon respectively in positions corresponding to the plurality of operation parts.

In the lens barrel, the electric switches are interconnected by a flexible printed circuit board.

Further, in the lens barrel, the ring-shaped elastic member is provided with an antislip knurled part.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
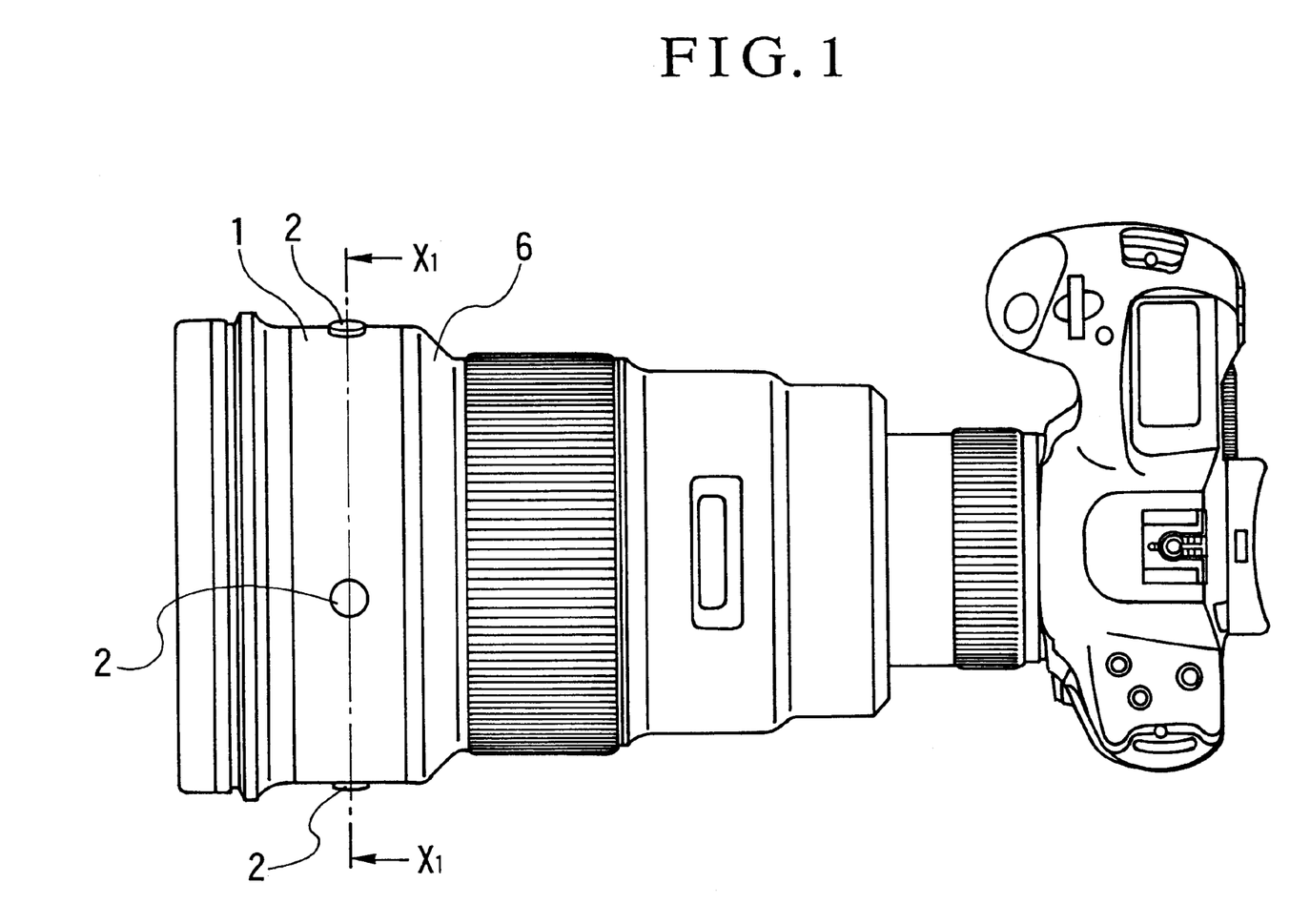
FIG. 1 is a plan view showing the appearance of a lens barrel according to a first embodiment of the invention.
Figure 2:
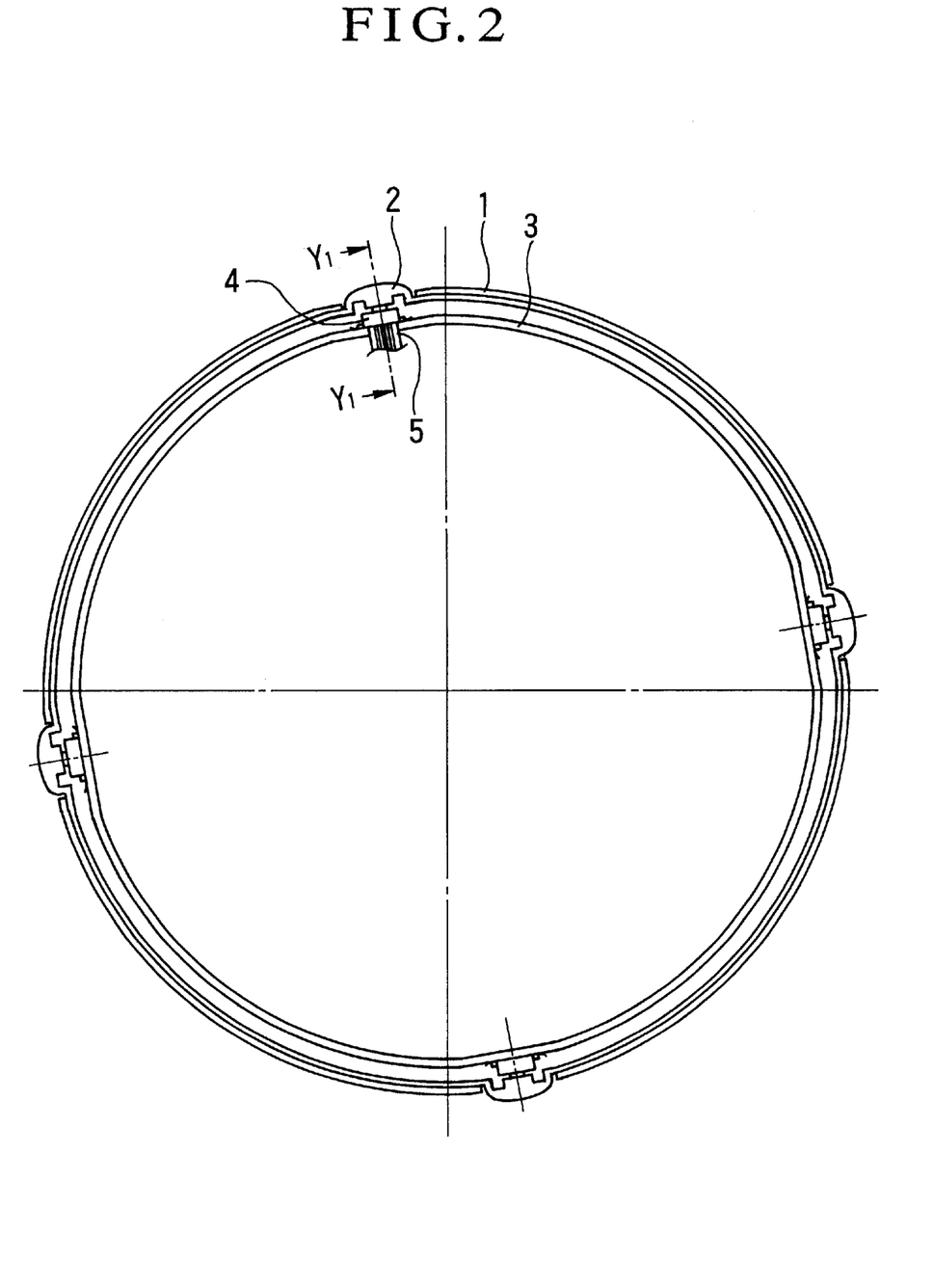
FIG. 2 is a sectional view taken on a line $X_1$—$X_1$ in FIG. 1.
Figure 3A:
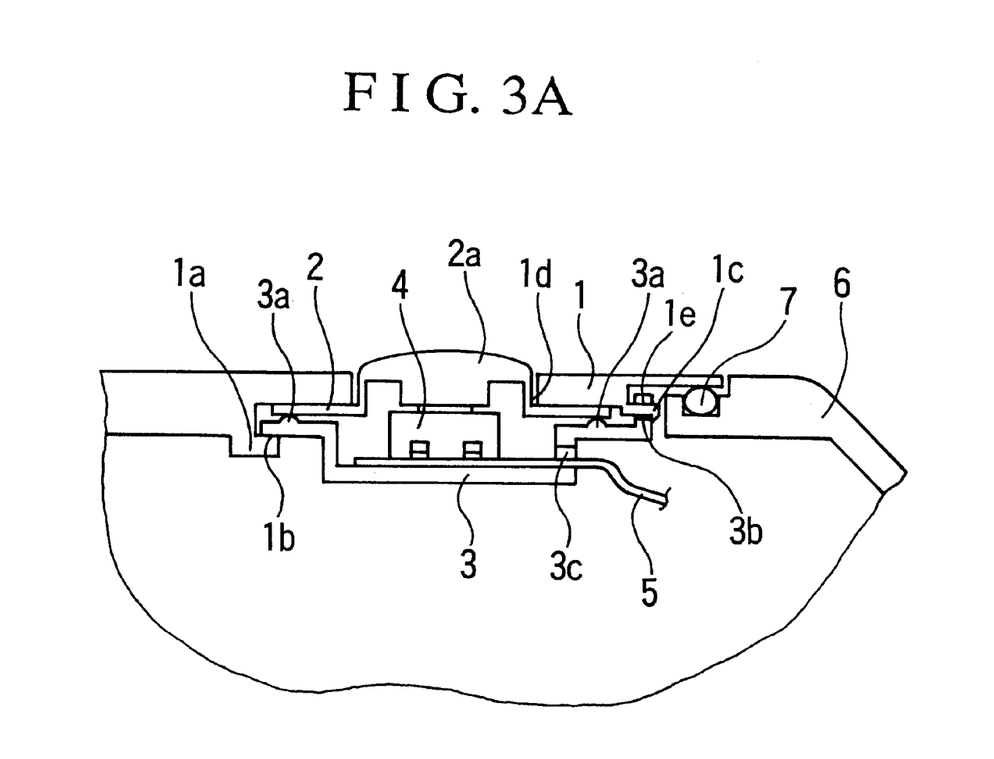
FIGS. 3A, 3B and 3C are sectional views taken on a line $Y_1$—$Y_1$ in FIG. 2.
Figure 3B:
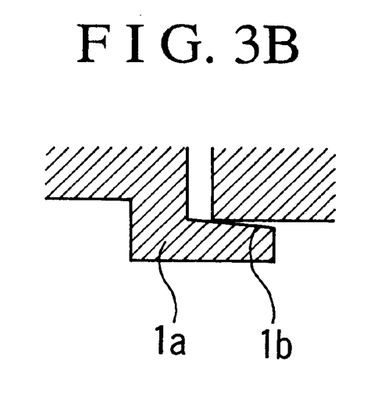
Figure 3C:
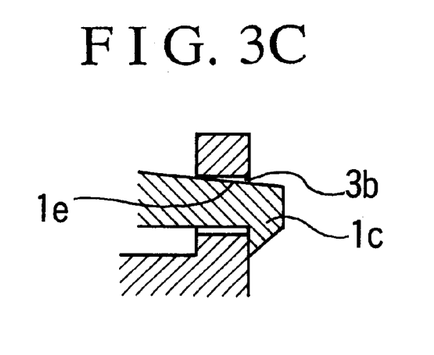
Figure 4:
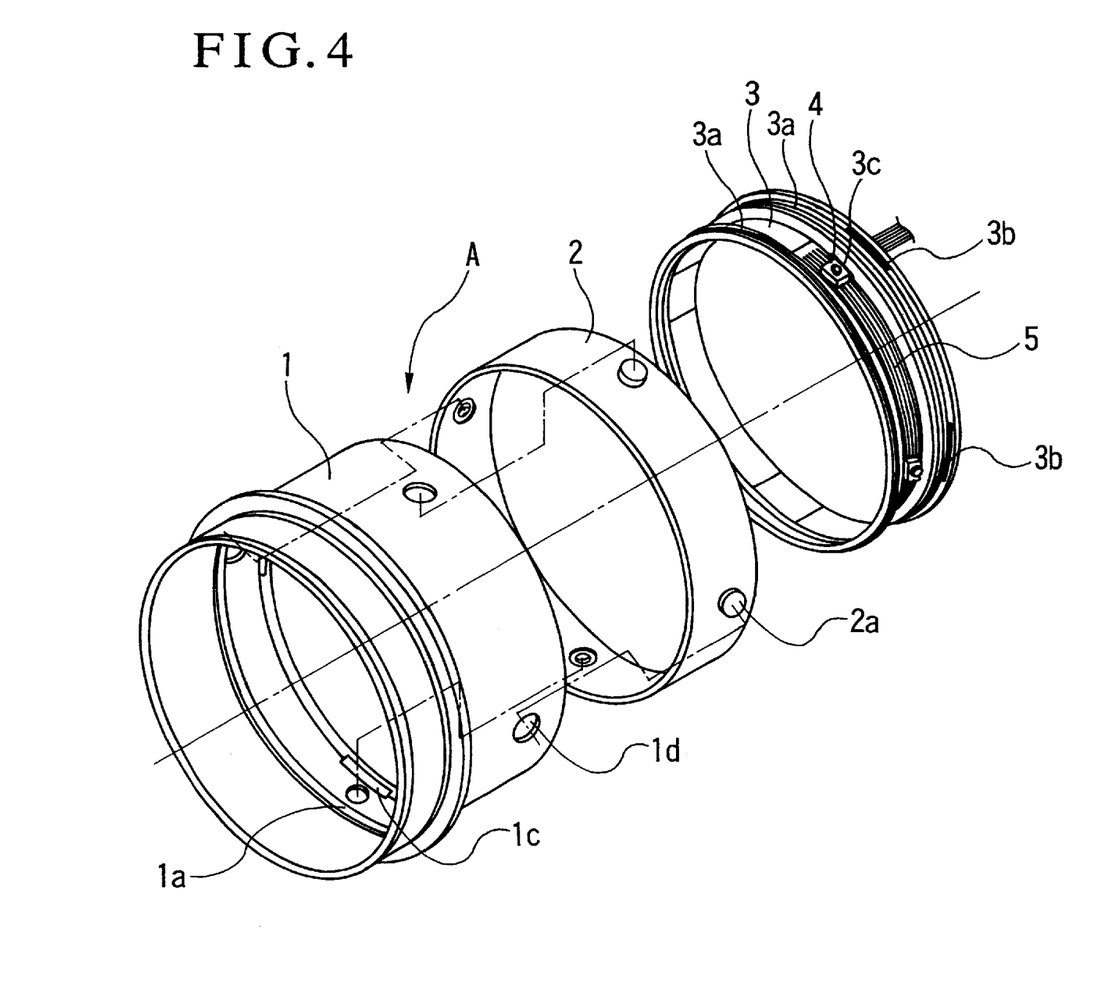
FIG. 4 is an exploded perspective view showing an operation switch unit A of the lens barrel shown in FIG. 1.

FIG. 1 shows the appearance of a lens barrel according to a first embodiment of the invention. FIG. 2 is a sectional view taken on a line $X_1$—$X_1$ in FIG. 1. FIGS. 3A, 3B and 3C are partial sectional views taken on a line $Y_1$—$Y_1$ in FIG. 2. FIG. 4 is an exploded perspective view showing an operation switch unit included in the lens barrel shown in FIG. 1. In FIGS. 1 to 4, there are illustrated an external fixed tube 1 of cylindrical shape, a ring-shaped button-type operation means 2 made of an elastic material such as rubber, an internal fixed tube 3, electric switches 4, a flexible printed circuit board 5 on which the electric switches 4 are mounted and which is connected to an electric circuit(not shown), a second external fixed tube 6, and an O-ring 7. The button-type operation means 2 is arranged to be operated by a camera user to cause a focusing lens to be locked at a focus position.

The lens barrel arranged as described above according to the first embodiment is assembled in a sequence of processes as described below.

Referring to FIG. 4, the ring-shaped button-type operation means 2 is first fitted into the inner side of the external fixed tube 1 while warping the ring-shaped button-type operation means 2 inward. The warped state of the ring-shaped button-type operation means 2 is nullified by adjusting the phase of the ring-shaped button-type operation means 2 to a phase where its button parts 2a are fitted into hole parts 1d provided in the external fixed tube 1. Since the ring-shaped button-type operation means 2 is made of an elastic material, the ring-shaped button-type operation means 2 can be kept in a state of being secured to the inner side of the external fixed tube 1.

The electric switches 4 are next mounted on lands provided at the flexible printed circuit board 5 which are provided for the electric switches 4. After that, the flexible printed circuit board 5 is fixed at a predetermined phasic position by a fixing means, such as a double-sided adhesive tape, along the outer curcumferential surface of the internal fixed tube 3. A connection part provided for connecting the flexible printed circuit board 5 to an electric circuit (not shown) is then pulled out from each hole part 3c provided in the internal fixed tube 3 as shown in FIG. 3A.

The internal fixed tube 3 which has the electric switches 4 and the flexible printed circuit board 5 fixed thereto is next inserted to the inner side of the external fixed tube 1 in which the button-type operation means 2 is fitted. At this time, a front flange part of the internal fixed tube 3 is caused to engage an engaging part 1a provided on the inner side of the external fixed tube 1, while a lock claw 1c provided on the inner side of the external fixed tube 1 is caused to be locked to a hole part 3b which is provided in a rear flange part of the internal fixed tube 3.

As shown in FIG. 3B, a part 1b of the engaging part 1a provided on the inner side of the external fixed tube 1 is formed in a tapered shape. When the front flange part of the internal fixed tube 3 engages this engaging part 1a, the tapered part 1b allows a projection 3a provided on the outer circumferential surface of the front flange part of the internal fixed tube 3 to push the button-type operation means 2 from inside over the whole inner circumferential surface thereof.

Further, as shown in FIG. 3C, a part 1e of the lock claw 1c provided on the inner side of the external fixed tube 1 is formed in a tapered shape. When the lock claw 1c is locked to the hole part 3b provided in the rear flange part of the internal fixed tube 3, the tapered part 1e allows a projection 3a provided on the outer circumference surface of the rear flange part of the internal fixed tube 3 to push the button-type operation means 2 from inside over the whole circumferential surface thereof. In addition to this action, the tapered part 1e serves to restrict the movement of the internal fixed tube 3 in the direction of an optical axis with respect to the external fixed tube 1. In short, such a pushing part blocks water drips and dust intruding through a clearance between the hole part 1d of the external fixed tube 1 and the button part 2a of the button-type operation means 2, so that an operation switch unit A having dust-proof and drip-proof capabilities can be attained.

A drip-proof capability can be easily imparted to the operation switch unit A by just connecting the operation switch unit A to the second external fixed tube 6 by using the O-ring 7 or the like.

With the lens barrel assembled in this manner, when the ring-shaped button-type operation means 2 is operated by the camera user, the electric switch 4 is turned on to allow the lens barrel to perform the focus lock operation or to start the AF (automatic focusing) operation.

As described above, the lens barrel according to the first embodiment is arranged to have the button-type operation means 2 made of an elastic member formed in a ring-like shape to endlessly extend along the whole inner circumferential surface of the external fixed tube. This arrangement permits the button-type operation means 2 to be easily inserted and fixed to the inner side of the external fixed tube without difficulty by utilizing the elasticity of the elastic member. Further, the inner circumferential surface of the ring-shaped elastic member is arranged to be pushed by the outer circumferential surface of the internal fixed tube which has the electric switches and the flexible printed circuit board fixed thereto. That arrangement not only permits the external fixed tube, the button-type operation means, the electric switches, the flexible printed circuit board and the internal fixed tube to be unitized into a button-type operation unit having a drip-proof capability, but also greatly facilitates assembly work.

While the first embodiment is arranged to have the elastic member disposed inside a fixed lens tube, a second embodiment of the invention is arranged to have an elastic member disposed outside a fixed lens tube.

Figure 5:
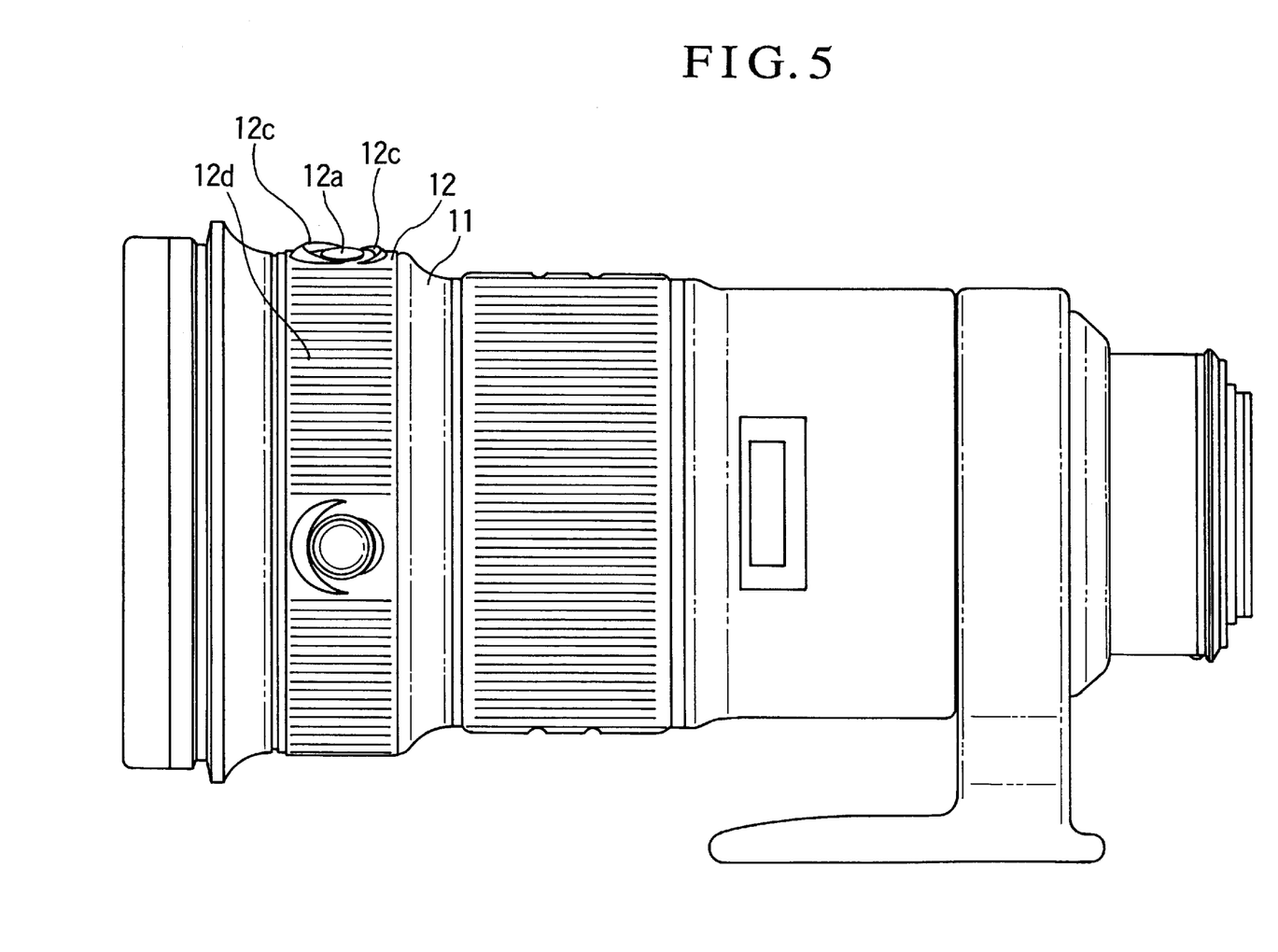
FIG. 5 is a plan view showing the appearance of a lens barrel according to a second embodiment of the invention.
Figure 6:
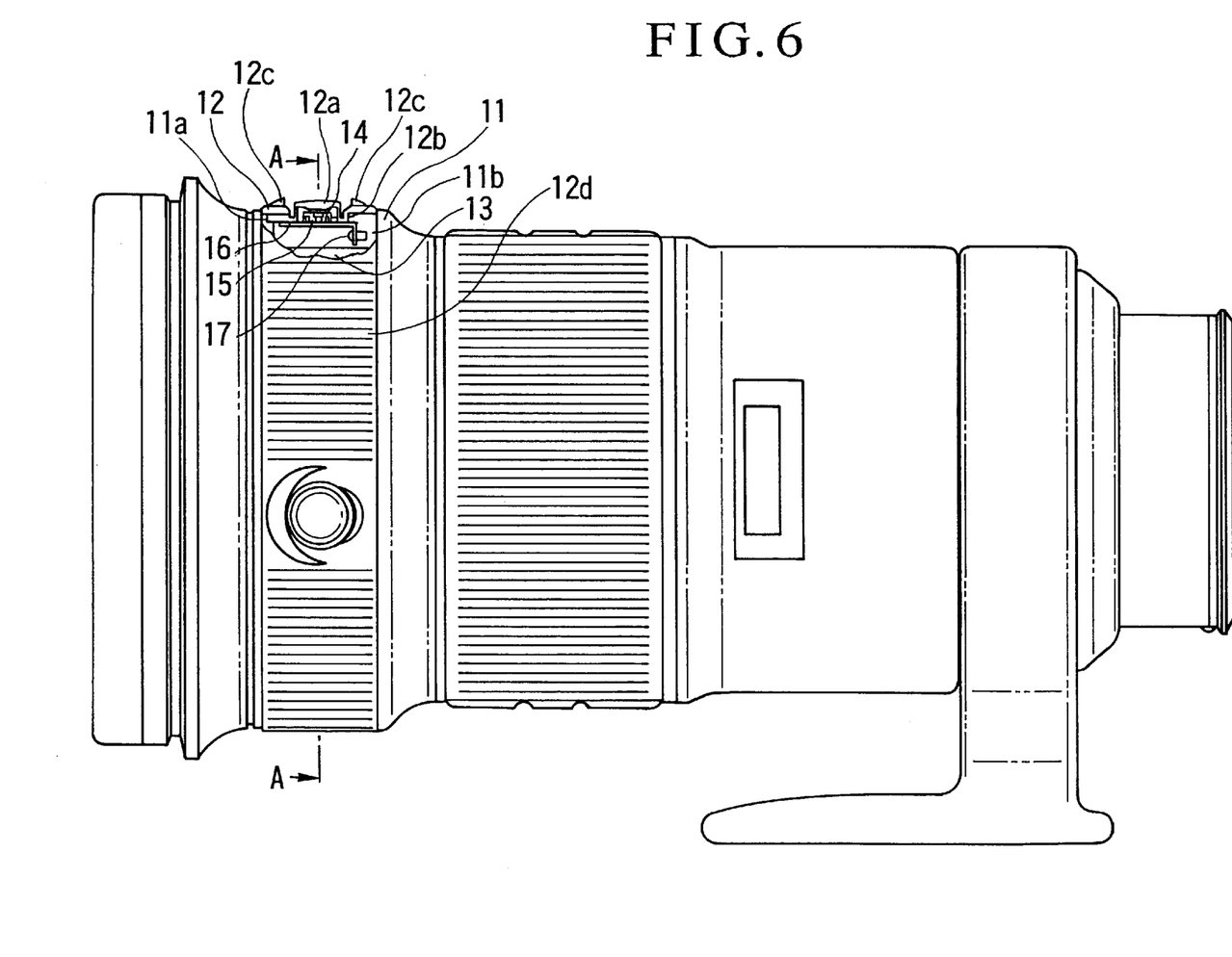
FIG. 6 is a plan view showing the appearance of the lens barrel shown in FIG. 5 with essential parts thereof illustrated in section by cutting out a part of the lens barrel.
Figure 7:
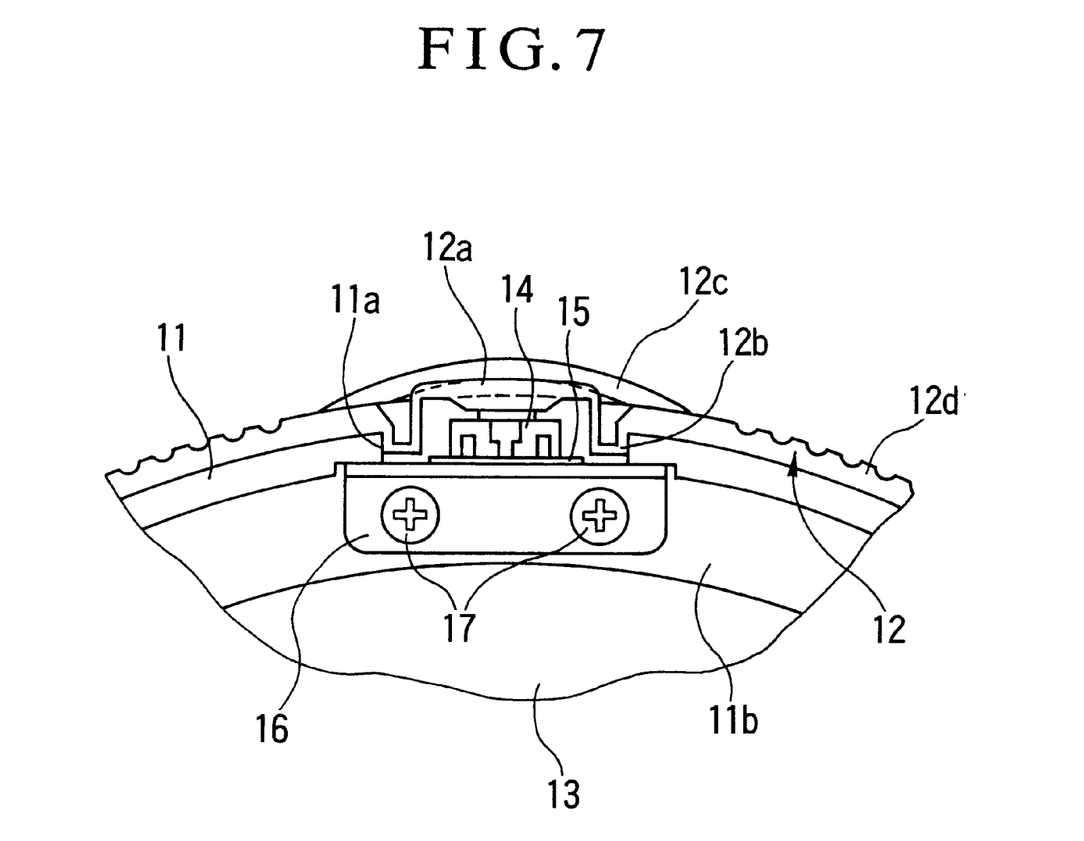
FIG. 7 is a sectional view taken on a line A—A in FIG. 6, showing the essential parts.

FIGS. 5, 6 and 7 relate to a lens barrel according to the second embodiment of the invention. FIG. 5 is a plan view of the lens barrel. FIG. 6 is a plan view showing the lens barrel with essential parts thereof illustrated in section by cutting out a part of the lens barrel. FIG. 7 is a sectional view taken on a line A—A in FIG. 6, showing the essential parts.

Referring to FIGS. 5, 6 and 7, an external fixed tube 11 having a cylindrical shape is provided with four hole parts 11a which are equally spaced along a front part of its outer circumferential surface. A flange part 11b is formed on the inner side of the external fixed tube 11 near to the hole parts 11a. An elastic ring 12 is made of an elastic material such as rubber and is provided with button-type operation parts 12a which are arranged at four equally spaced parts. Each of the button-type operation parts 12a has a projection 12b formed on the inner side of the operation part 12a in a size suited for engaging a corresponding one of the hole parts 11a. Each of the button-type operation parts 12a is provided with protruding parts 12c which protrude outward from the button-type operation part 12a and are opposed to each other across the button-type operation part 12a in the direction of the optical axis in such a way as to prevent the button-type operation part 12a from being inadvertently pushed when the lens barrel is held by the camera user. The whole outer circumferential surface of the elastic ring 12, except the button-type operation parts 12a, is provided with antislip knurling 12d.

Further, there are illustrated an internal fixed tube 13, electric switches 14, and a flexible printed circuit board 15 having the electric switches 14 mounted thereon. The flexible printed circuit board 15 is connected to an electric circuit (not shown) and is secured to a switch fixing member 16 with an adhesive or the like. The switch fixing member 16 is mounted on the flange part 11b of the external fixed tube 11 with a screw 17 in such a position as to have the electric switch 14 located below the hole part 11a.

In the manufacture of the lens barrel arranged to include the above-stated component parts according to the second embodiment, the lens barrel is assembled as described below.

The electric switches 14 are first mounted on lands at four parts of the flexible printed circuit board 15, as shown in FIGS. 6 and 7. Then, the reverse sides of the parts of the flexible printed circuit board 15 where the electric switches 14 are mounted are secured to the switch fixing member 16 with adhesive means such as a double-sided adhesive tape or the like. The switch fixing member 16 is secured to the flange part 11b on the inner side of the external fixed tube 11 with the screw 17 from the direction of the optical axis in such a way as to have the electric switch 14 located below the hole part 11a.

Here, the electric switch 14 is mounted while taking care that the electric switch 14 does not interfere with the elastic ring 12 to be damaged by protruding from the outer side of the external fixed tube 11 while the elastic ring 12 is in process of being attached to the external fixed tube 11.

Next, the elastic ring 12 is fitted on the outer circumferential surface of the external fixed tube 11. The elastic ring 12 is then fixed with an adhesive in a phasic position where the projections 12b disposed on the inner sides of the button-type operation parts 12a come to fit into the hole parts 11a of the external fixed tube 11. At this time, only the projections 12b located at one of four fitting parts are fitted into the corresponding hole part 11a, while some margin is provided at each of the other three fitting parts between the projections 12b and the hole part 11a. This structural arrangement effectively permits the elastic ring 12 to be tightly fixed to the outer circumferential surface of the external fixed tube 11 without leaving any gap between them. In other words, the tight attaching arrangement effectively prevents intrusion of any water drip or dust from the clearance between the external fixed tube 11 and the elastic ring 12, so that internal mechanical and electric parts can be protected.

The second embodiment is arranged to have the elastic ring 12 with the button-type operation parts secured to the external fixed tube 11 by means of some adhesive. However, this arrangement may be changed to make the inside diameter of the elastic ring 12 having the button-type operation parts a little smaller than the outside diameter of the external fixed tube 11 and to fit the elastic ring 12 on the external fixed tube 11 by slightly pulling and expanding the elastic ring 12. Then, the elastic contracting force of the elastic ring 12 having the button-type operation parts obviates the necessity of fixing the elastic ring 12 with adhesive.

The second embodiment is arranged to use a rubber material for the elastic ring 12 having the button-type operation parts. However, the invention is not limited to the use of a rubber material. The rubber material of course may be replaced with some other suitable elastic material as long as the material is moldable.

Further, the second embodiment is arranged to provide the projections 12b on the elastic ring 12 having the button-type operation part and to fit the projections 12b into the hole parts 11a of the external fixed tube 11. This arrangement, however, may be conversely changed to provide projections on the external fixed tube 11 and recessed parts in the elastic ring 12 for fitting engagement.

According to the above-described second embodiment, in a lens barrel capable of performing automatic focusing and manual focusing, a ring-shaped elastic member and at least one button-type operation member are fixedly provided on the outer circumferential surface of an external fixed tube, and the ring-shaped elastic member and the button-type operation member are formed integrally with each other. Accordingly, even in a case where a plurality of button-type operation members, such as focus lock switches, AF switches or image stabilizing switches, having a drip-proof capability are disposed at a plurality of positions on the outer circumferential surface of the external fixed tube of the lens barrel, assembly work on the lens barrel can be remarkably improved, thereby decreasing the cost of assembly.

What is claimed is:

1. A lens barrel comprising:

a fixed lens tube of cylindrical shape; and at least an operation part of push type, wherein said operation part is integrally formed in a ring-shaped elastic member and is attached to said fixed lens tube.

2. A lens barrel according to claim 1, wherein said ring-shaped elastic member is attached to an inner circumferential surface of said fixed lens tube.

3. A lens barrel according to claim 2, wherein said lens barrel includes a plurality of operation parts of push type, said plurality of operation parts being integrally formed in said ring-shaped elastic member and attached to said fixed tube and said lens barrel further comprising a second lens tube of cylindrical shape which is disposed on an inner side of said ring-shaped elastic member and which has electric switches disposed thereon respectively in positions corresponding to said plurality of operation parts, and wherein each of said electric switches is operable by operating a corresponding one of said plurality of operation parts.

4. A lens barrel according to claim 3, wherein said electric switches are interconnected by a flexible printed circuit board.

5. A lens barrel according to claim 3, wherein said ring-shaped elastic member is pushed and pressed by an outer circumferential surface of said second lens tube.

6. A lens barrel according to claim 1, wherein said ring-shaped elastic member is attached to an outer circumferential surface of said fixed lens tube.

7. A lens barrel according to claim 6, wherein said lens barrel includes a plurality of operation parts of push type, said plurality of operation parts being integrally formed in said ring-shaped elastic member and attached to said fixed tube and wherein said fixed lens tube has electric switches disposed thereon respectively in positions corresponding to said plurality of operation parts.

8. A lens barrel according to claim 7, wherein said electric switches are interconnected by a flexible printed circuit board.

9. A lens barrel according to claim 7, wherein said ring-shaped elastic member is provided with an antislip knurled part.

* * * * *